US012252250B2

(12) United States Patent
Cui

(10) Patent No.: US 12,252,250 B2
(45) Date of Patent: Mar. 18, 2025

(54) AVIATION TURBOFAN ENGINE AND FAN DUCT NOZZLE

(71) Applicants: Beijing Aeronautical Science & Technology Research Inst., Commercial Aircraft Corporation of China, Beijing (CN); COMMERCIAL AIRCRAFT CORPORATION OF CHINA, LTD., Shanghai (CN)

(72) Inventor: Zheng Cui, Beijing (CN)

(73) Assignees: BEIJING AERONAUTICAL SCIENCE & TECHNOLOGY RESEARCH INSTITUTE, COMMERCIAL AIRCRAFT CORPORATION OF CHINA, Beijing (CN); COMMERCIAL AIRCRAFT CORPORATION OF CHINA, LTD., Shanghai (CN)

( * ) Notice: Subject to any disclaimer, the term of this patent is extended or adjusted under 35 U.S.C. 154(b) by 0 days.

(21) Appl. No.: 18/396,195

(22) Filed: Dec. 26, 2023

(65) Prior Publication Data
US 2024/0124121 A1  Apr. 18, 2024

Related U.S. Application Data

(63) Continuation of application No. PCT/CN2022/129923, filed on Nov. 4, 2022.

(30) Foreign Application Priority Data

Mar. 22, 2022 (CN) .......................... 202210283285.9

(51) Int. Cl.
F02K 1/52      (2006.01)
B64C 7/02      (2006.01)
(Continued)

(52) U.S. Cl.
CPC ................. *B64C 7/02* (2013.01); *F02K 1/40* (2013.01); *F02K 1/52* (2013.01); *B64C 7/00* (2013.01); *F05D 2220/36* (2013.01)

(58) Field of Classification Search
CPC .......... B64D 33/04; B64D 27/40; B64C 7/00; F02K 1/40; F02K 1/52
See application file for complete search history.

(56) References Cited

U.S. PATENT DOCUMENTS 4,466,587 A * 8/1984 Dusa ..................... B64D 29/02
                                              244/1 N
2002/0178711 A1  12/2002 Martens
(Continued)

FOREIGN PATENT DOCUMENTS

CN     101687542 A     3/2010
CN     102278231 A    12/2011
(Continued)

Primary Examiner — Gerald L Sung
(74) Attorney, Agent, or Firm — NKL Law; Allen Xue

(57) ABSTRACT

A fan duct nozzle of an aviation turbofan engine. A notch is formed in a rear edge of an engine nacelle on an outer side of an engine pylon, and a flow guide curved surface matching the notch in shape is arranged on a profile of the fan duct nozzle. The notch is unilaterally formed in the outer side of the engine pylon, and a transition section between the notch and the rear edge of the engine nacelle includes two transition rounded corners. The present disclosure adopts a unilateral notch-shaped nozzle in the external duct of the turbofan engine, uses high-speed flowing of venting by an engine fan to provide flowing protection for an airfoil, improves a lift coefficient, and reduces negative impact on the airfoil exerted by the engine nacelle at a high incidence, thus lowering resistance, lowering a weight of the nacelle, and improving a lift-drag ratio.

5 Claims, 2 Drawing Sheets

(51) Int. Cl.
*F02K 1/40* (2006.01)
*B64C 7/00* (2006.01)

(56) References Cited

U.S. PATENT DOCUMENTS

| | | | | |
|---|---|---|---|---|
| 2004/0140397 | A1* | 7/2004 | Dun | B64C 7/02 |
| | | | | 244/55 |
| 2005/0011993 | A1 | 1/2005 | Konings | |
| 2007/0033922 | A1* | 2/2007 | Reba | F02K 1/386 |
| | | | | 60/770 |
| 2008/0272228 | A1* | 11/2008 | Mengle | F02K 1/386 |
| | | | | 244/54 |
| 2010/0115958 | A1 | 5/2010 | Parham | |
| 2011/0277448 | A1* | 11/2011 | Roberts | F02K 1/625 |
| | | | | 60/226.2 |
| 2014/0061331 | A1* | 3/2014 | Leyko | F02K 3/06 |
| | | | | 239/265.11 |
| 2016/0040627 | A1* | 2/2016 | Zsurka | B64D 33/04 |
| | | | | 415/211.2 |
| 2017/0159674 | A1* | 6/2017 | Maciolek | B64C 11/001 |

FOREIGN PATENT DOCUMENTS

| | | |
|---|---|---|
| CN | 109751284 A | 5/2019 |
| CN | 111959798 A | 11/2020 |
| CN | 112824665 A | 5/2021 |
| CN | 114715416 A | 7/2022 |
| CN | 217416120 U | 9/2022 |

* cited by examiner

AVIATION TURBOFAN ENGINE AND FAN DUCT NOZZLE

TECHNICAL FIELD

The present disclosure relates to the technical field of aviation turbofan engines, in particular to an aviation turbofan engine and a fan duct nozzle.

BACKGROUND

Currently, many civil airplanes use high bypass ratio turbofan engines as propulsion power apparatus, and in order to pursue higher propulsion efficiency and better fuel economy, the bypass ratios of modern commercial aircraft engines are increasing, leading to larger dimensions, which in turn bring some adverse effects to the aerodynamic and structural design of airfoils. In terms of aerodynamic design, the increase in the wetted area of a nacelle increases an airplane's friction drag. In low-speed and high-angle-of-attack conditions, the nacelle strongly shields the incoming flow to the airfoil, which can easily cause flow separation and loss of lift.

In order to counteract the adverse effects of increased engine nacelle size on the airfoil, it is common practice to use nacelle strakes to provide flow protection for the wing. Nacelle strakes can to some extent compensate for the shielding effect of the engine nacelle on the wing airflow. The inner side of the nacelle, being located at the wing-body junction, experiences higher flow velocities, resulting in more effective installation of nacelle strakes correspondingly, while the outer side is relatively less effective. Additionally, nacelle strakes generate significant drag and increase the airplane's weight, thereby reducing its cost-effectiveness.

SUMMARY

The present disclosure aims to overcome at least one of the shortcomings of the prior art, and provides an aviation turbofan engine and a fan duct nozzle. The present disclosure uses high-speed flowing of venting by an engine fan to provide flowing protection for an airfoil, improves a lift coefficient, and reduces negative impact on the airfoil exerted by the engine nacelle at a high incidence.

The present disclosure adopts the following technical solution:

In one aspect, the present disclosure provides a fan duct nozzle of an aviation turbofan engine. A notch is formed in a rear edge of an engine nacelle on an outer side of an engine pylon, and a flow guide curved surface matching the notch in shape is arranged on a profile of the fan duct nozzle.

In any one possible implementation mentioned above, one implementation is further provided. The notch is unilaterally formed in the outer side of the engine pylon, and a transition section between the notch and the rear edge of the engine nacelle includes two segments of transition rounded corners. A role of the transition rounded corners is stabilizing flowing of a jet flow so as to avoid generation of excessively large separation vortex or aerodynamic noises. The transition rounded corners should be no larger than 90°. A percentage of a circular arc section should be no larger than 50% of a width of the notch.

In any one possible implementation mentioned above, one implementation is further provided. The notch is formed in a range of 0° to 90° on a circumference of the outer side of the engine pylon.

In any one possible implementation mentioned above, one implementation is further provided. The flow guide curved surface is in smooth transition to the profile of the external duct and has one or a plurality of segments of flow guide curved surface controlling lines; and the flow guide curved surface is shaped by a plurality of bridging curved surfaces, each bridging curved surface maintains curvature continuity with an inner curved surface of the external duct of the engine, and a length of each bridging curved surface is not larger than 50% of a width of the notch so as not to excessively affect a shape of an internal duct nozzle. A specific profile and shape need to be determined by an aerodynamic optimization design.

A role of the flow guide curved surface controlling lines is complementing an airfoil profile of the nacelle so that the airfoil profile of the nacelle with the additional notch design can maintain a streamline shape in low resistance, thus lowering an aerodynamic resistance cost brought by an apparatus.

In any one possible implementation mentioned above, one implementation is further provided. The fan duct nozzle and an outer profile of the engine nacelle are integrally formed.

In any one possible implementation mentioned above, one implementation is further provided. The notch includes a circular arc section and a connecting section, the circular arc section is connected to the connecting section through a first transition rounded corner, the connecting section is connected to the rear edge of the engine nacelle through a second transition rounded corner, and neither the first transition rounded corner, nor the second transition rounded corner is larger than 90°.

In any one possible implementation mentioned above, one implementation is further provided. A depth of the notch is not larger than 20% of a mean aerodynamic chord length of the engine nacelle and not smaller than 5% of the mean aerodynamic chord length of the engine nacelle; and a width of the notch is not larger than ¼ of a perimeter of the rear edge of the engine nacelle and not smaller than ¹⁄₂₀ of the perimeter of the rear edge of the engine nacelle.

In any one possible implementation mentioned above, one implementation is further provided. A percentage of the circular arc section is not larger than 50% of the width of the notch.

In another aspect, the present disclosure further provides an aviation turbofan engine. The aviation turbofan engine has the above fan duct nozzle of the aviation turbofan engine.

Further, a lift coefficient of the aviation turbofan engine is increased by 1%-2%.

The present disclosure has the beneficial effects as follows:

1. The present disclosure adopts a unilateral notch-shaped nozzle in the external duct of the turbofan engine, uses high-speed flowing of venting by an engine fan to provide flowing protection for an airfoil, improves a lift coefficient, and reduces negative impact on the airfoil exerted by the engine nacelle at a high incidence, thus lowering resistance, lowering a weight of the nacelle, and improving the lift coefficient and a lift-drag ratio of an airplane.

2. The principle of the present disclosure differs from that of nacelle strakes. The present disclosure has the potential to substitute a function of a nacelle spoiler on an outer side and is small in resistance, free of weight burden and capable of improving the performance and economic benefit of a commercial airplane product, thus improving competitiveness of the product.

Figure 1:
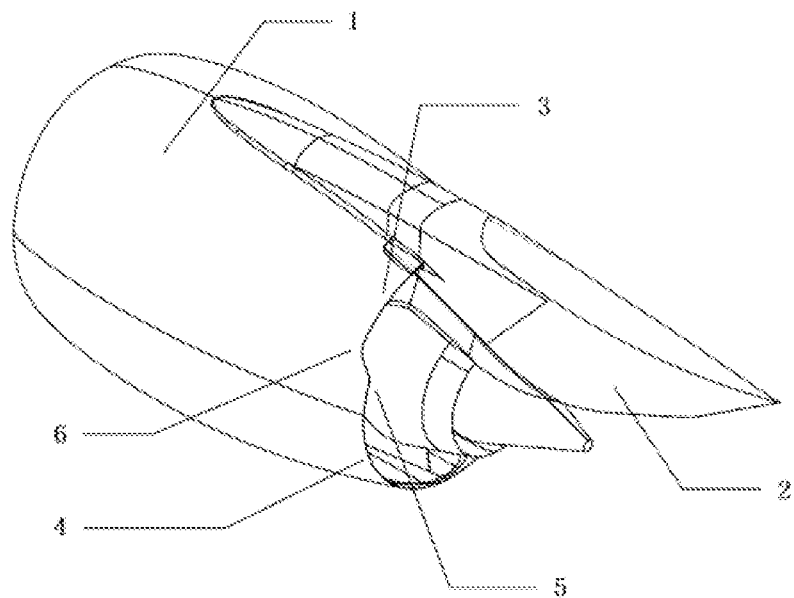
FIG. 1 is an axonometric outside view of a fan duct nozzle of an aviation turbofan engine in an embodiment of the present disclosure.

In the drawings: 1—engine nacelle; 2—engine pylon; 3—notch; 4—rear edge of engine nacelle; 5—first transition rounded corner; 6—second transition rounded corner; 7—flow guide curved surface; 8—flow guide curved surface controlling line.

DETAILED DESCRIPTION

Specific embodiments of the present disclosure will be described in detail below in combination with specific drawings. It should be noted that the technical feature and a combination of technical features described in the embodiments below should not be deemed isolated. They may be combined with each other to achieve a better technical effect. In the drawings of the following embodiments, the same label numbers appearing in all the drawings represent the same features or components and may be applied to different embodiments.

An embodiment of the present disclosure provides a fan duct nozzle of an aviation turbofan engine. The fan duct nozzle is formed in a rear edge of an engine nacelle, and a "notch-shaped" rear edge shape is designed at an outer side of an engine pylon. A flow guide curved surface matching the notch in shape is designed on a profile of the fan duct nozzle.

In one specific embodiment, a fan duct nozzle of an aviation turbofan engine is as shown in FIG. 1. The present disclosure is a novel design of a fan duct nozzle. A notch-shaped nozzle is designed on an outer side of an engine pylon 2, a notch 3 and an engine nacelle 1 are integrally designed, and the notch 3 is formed in a location close to the engine pylon 2 and is unilaterally formed in the outer side of the engine pylon 2. Preferably, a depth of the notch 3 is not larger than 20% of a mean aerodynamic chord length of the engine nacelle and not smaller than 5% of the mean aerodynamic chord length of the engine nacelle; and a width of the notch is not larger than ¼ of a perimeter of the rear edge of the engine nacelle and not smaller than 1/20 of the perimeter of the rear edge of the engine nacelle. To further optimize, the depth of the notch 3 is not larger than 10% of the mean aerodynamic chord length of the nacelle, and the width of the notch 3 is not larger than 1/6 of the perimeter of the rear edge of the nacelle.

A transition between the notch 3 and a rear edge 4 of the engine nacelle has two segments of transition rounded corners, respectively a notch first transition rounded corner 5 and a notch second transition rounded corner 6 in the drawing. A role of the transition rounded corners 5 and 6 is stabilizing flowing of a jet flow so as to avoid generation of excessively large separation vortex or aerodynamic noises. The transition rounded corners 5 and 6 should be no larger than 90°. A percentage of a circular arc section should be no larger than 50% of the width of the notch.

Main components of the present disclosure and a shape of the nacelle as well as a curved surface of an internal duct of the engine are integrally designed, and the notch nozzle is in a fixed shape, so no motion relation exists.

Figure 2:
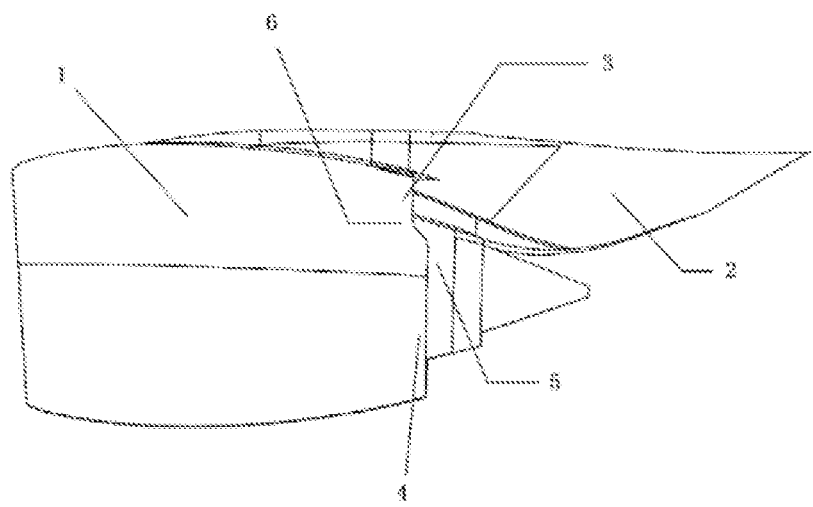
FIG. 2 is a side view of a fan duct nozzle of an aviation turbofan engine in an embodiment.
Figure 3:
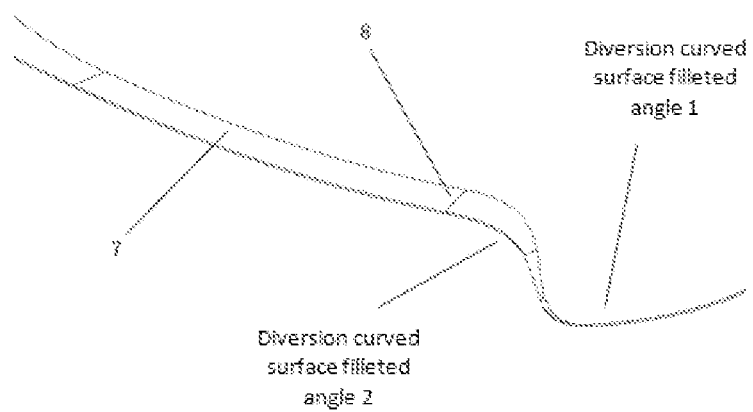
FIG. 3 is a schematic diagram of a flow guide curved surface in an embodiment (a visual angle of looking outward from an external duct of an engine).

As shown in FIG. 2, the notch nozzle is installed on the outer side of the engine nacelle pylon 2, and a location of the notch 3 is close to the engine nacelle 1 and is on an upper part of the engine nacelle 1; the notch nozzle and the rear edge 4 of the engine nacelle are transited through two segments of transition rounded corners; the notch nozzle 3 and an outer profile of the engine nacelle 1 are integrally designed; and a flow guide curved surface 7 matching the notch 3 in shape is designed on a profile of the fan duct nozzle. A design of the flow guide curved surface 7 is as shown in FIG. 3. The flow guide curved surface 7 matches the notch nozzle in shape, is in smooth transition to the profile of the external duct and has one or a plurality of segments of flow guide curved surface controlling lines 8; a 1 # chamfer of the flow guide curved surface 7 corresponds to the first transition rounded corner 5 of the notch nozzle in location; and a 2 # chamfer of the flow guide curved surface corresponds to the second transition rounded corner 6 of the notch nozzle.

The flow guide curved surface 7 is shaped by a plurality of bridging curved surfaces, each bridging curved surface maintains curvature continuity with an inner curved surface of the external duct of the engine, and a length of each bridging curved surface is not larger than 50% of a width of the notch 3 so as not to affect a shape of an internal duct nozzle excessively. A specific profile and shape need to be determined by an aerodynamic optimization design.

A role of the flow guide curved surface controlling lines 8 is complementing an airfoil profile of the nacelle so that the airfoil profile of the nacelle with the additional notch design can maintain a streamline shape in low resistance, thus lowering an aerodynamic resistance cost.

The notch nozzle and the corresponding flow guide curved surface 7 may outwardly extract a part of high-energy flowing of the external duct, charge for local flowing of an upper surface of the airfoil, and thus provide certain flowing protection for a front edge of the airfoil in a high incidence working condition of an airplane. Therefore, negative flowing interference caused by a large-size nacelle on the airfoil may be reduced and a lift coefficient and an aerodynamic efficiency of the airplane may be increased.

The notch 3 penetrates through the external duct of the nacelle. In the case of direct penetration, a thickness of the rear edge at the notch 3 will be larger than a thickness of the other part of a rear edge 4 of the nacelle. In order to ensure consistent thickness of the rear edge 4 of the nacelle, a notch size in the inner profile of the nacelle needs to be larger than a notch size in the outer profile of the nacelle, and then the flow guide curved surface 7 is added to rapidly contract the rear edge 4 of the nacelle at the notch 3, so that the thickness of the rear edge at the notch 3 is roughly equal to the thickness of the other part of the rear edge 4 of the nacelle.

The present disclosure is innovative in that:

1. The functional realization principle of the present disclosure differs from that of nacelle strakes. It primarily regulates the distribution of jet flow energy within critical regions to achieve flow protection for the wing leading edge, thereby avoiding adverse aerodynamic interference between the inner and outer nacelle strakes.

2. The present disclosure can reduce drag and weight while providing flow protection for the wing, offering significant advantages in terms of both resistance and weight compared to nacelle strakes.

3. The present disclosure allows for integrated design and manufacturing with the nacelle, avoiding additional structural components and additional mechanical connections, which is beneficial for improving equipment maintainability and reducing costs.

4. The design shape of the external duct flow guide curved surface and the notch in the inner profile of the nacelle are slightly larger than the geometric characteristics of the notch size in the outer profile.

5. The inner surface curved surface of the nacelle extends from the inner profile to the rear edge, maintaining smooth transition geometric characteristics.

While various embodiments have been disclosed herein, those skilled in the art should understand that the embodiments herein may be altered without departing from the spirit of the present disclosure. The embodiments above are for purposes of illustration and are not intended to limit the scope of claims of the present disclosure.

The invention claimed is:

1. A fan duct nozzle of an aviation turbofan engine, comprising a notch formed in a rear edge of an engine nacelle on an outer side of an engine pylon, and a flow guide curved surface matching the notch in shape is arranged on a profile of the fan duct nozzle, wherein a depth of the notch is not larger than 20% of a mean aerodynamic chord of the engine nacelle and not smaller than 5% of the mean aerodynamic chord of the engine nacelle, and a width of the notch is not larger than ¼ of a perimeter of the rear edge of the engine nacelle and not smaller than 1/20 of the perimeter of the rear edge of the engine nacelle.

2. The fan duct nozzle of the aviation turbofan engine according to claim 1, wherein the notch is formed in a range of 0° to 90° on a circumference of the outer side of the engine pylon.

3. The fan duct nozzle of the aviation turbofan engine according to claim 1, wherein the fan duct nozzle and an outer surface of the engine nacelle are integrally formed.

4. An aviation turbofan engine, having the fan duct nozzle of the aviation turbofan engine according to claim 1.

5. The aviation turbofan engine according to claim 4, wherein a lift coefficient of the aviation turbofan engine is increased by 1%-2%.

* * * * *